Oct. 8, 1957 J. R. YOUNKIN 2,808,989
COMPUTER FOR SOLVING SIMULTANEOUS EQUATIONS
Filed Sept. 20, 1954 2 Sheets-Sheet 1

INVENTOR.
J. R. YOUNKIN
BY
Hudson & Young
ATTORNEYS

Oct. 8, 1957 J. R. YOUNKIN 2,808,989
COMPUTER FOR SOLVING SIMULTANEOUS EQUATIONS
Filed Sept. 20, 1954 2 Sheets-Sheet 2

INVENTOR.
J. R. YOUNKIN
BY *Hudson & Young*
ATTORNEYS

United States Patent Office 2,808,989
Patented Oct. 8, 1957

2,808,989
COMPUTER FOR SOLVING SIMULTANEOUS EQUATIONS

James R. Younkin, Bartlesville, Okla., assignor to Phillips Petroleum Company, a corporation of Delaware Application September 20, 1954, Serial No. 457,224

7 Claims. (Cl. 235—61)

This invention relates to a computer for solving simultaneous linear equations.

The rapid solution of sets of simultaneous linear equations is of considerable importance in various industries. For example, the analysis of materials by infrared or mass spectroscopy often involves the solution of such equations. Elementary methods of elimination or substitution generally are not satisfactory for systems having more than four variables. While systems having more than four variables can be solved by methods of successive approximations, this procedure requires a considerable knowledge of mathematics and is often time consuming. For these reasons a number of computers have recently been developed to solve simultaneous equations by the Gauss-Siedel method of iteration. These computers generally employ a plurality of pairs of cascade connected potentiometers to perform the multiplication operations. The addition operations are performed by summing networks which are connected to current indicating devices to determine the condition of balance. The values of the known quantities are established on appropriate potentiometers and the balancing potentiometers are adjusted in succession until a solution is obtained. While computers of this type operate in a satisfactory manner, they often require a considerable period of time to determine the exact solution.

In accordance with the present invention there is provided an improved computer for solving simultaneous linear equations which employs a plurality of servo motors to perform the balancing operations automatically in each network. The voltage sums to be compared are applied in opposition to the inputs of the servo motors in each network. This computer is thus capable of solving sets of simultaneous linear equations having large numbers of unknowns in extremely short times.

Accordingly, it is an object of this invention to provide an automatic computer for solving simultaneous linear equations.

Another object is to provide a simultaneous linear equation computer which is energized by a source of alternating potential.

Other objects, advantages and features of this invention should become apparent from the following detailed description taken in conjunction with the accompanying drawing in which.

The electrical computer of this invention is adapted to solve a general set of simultaneous linear equations of the form.

$$a_{11}x_1 + a_{12}x_2 + \ldots + a_{1n}x_n = k_1$$
$$a_{21}x_1 + a_{22}x_2 + \ldots + a_{2n}x_n = k_2$$
$$a_{n1}x_1 + a_{n2}x_2 + \ldots + a_{nn}x_n = k_n$$

This set of equations can also be designated as follows:

$$\sum_{j=1}^{n} a_{ij}x_j = k_i$$

($i = 1$ to $n$, where $n$ is a positive integer.)

Figure 1:
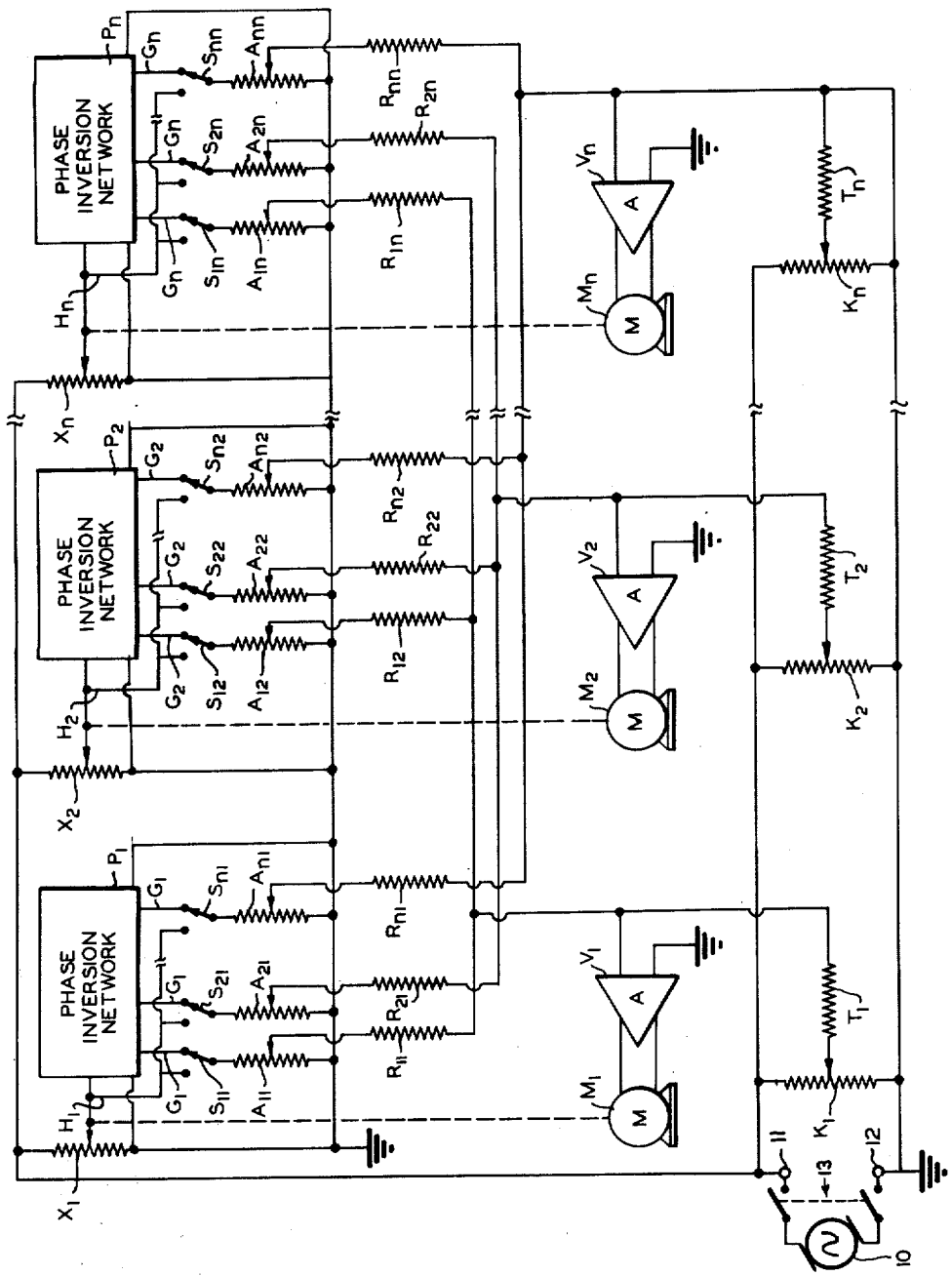
Figure 1 is a schematic circuit diagram of the computer assembly of this invention.

With reference to Figure 1, the computer network is energized by a source of alternating potential 10 having output terminals 11 and 12, the latter being connected to ground. Terminal 11 is connected to corresponding first end terminals of a plurality of potentiometers $X_1$, $X_2 \ldots X_n$. Corresponding second end terminals of these potentiometers are connected to ground. Terminal 11 is also connected to the first end terminals of a plurality of potentiometers $K_1$, $K_2 \ldots K_n$. The second end terminals of this second group of potentiometers are also connected to ground. The contactors of potentiometers $X_1$, $X_2 \ldots X_n$ are connected to input terminals of respective phase inversion network $P_1$, $P_2 \ldots P_n$. Network $P_1$ is provided with a plurality of output leads $G_1$ which are maintained at a common potential that is 180° out of phase with the potential at the contactor of potentiometers $X_1$. Networks $P_2 \ldots P_n$ are provided with corresponding respective output leads $G_2 \ldots G_n$.

A plurality of potentiometers $A_{11}$, $A_{21} \ldots A_{n1}$ is provided in conjunction with phase inversion network $P_1$. Corresponding first end terminals of these potentiometers are grounded and corresponding second end terminals are connected to respective switches $S_{11}$, $S_{21} \ldots S_{n1}$. These switches are adapted to engage respective leads $G_1$ in their right-hand positions and a lead $H_1$ in their left-hand positions. Lead $H_1$ is connected to the contactor of potentiometer $X_1$. The contactors of potentiometers $A_{11}$, $A_{22} \ldots A_{n1}$ are connected to first terminals of respective resistors $R_{11}$, $R_{21} \ldots R_{n1}$. Potentiometers $A_{11}$, $A_{21} \ldots A_{n1}$ should have considerably higher resistances than potentiometer $X$, to prevent substantial current flow from potentiometer $X_1$. For example, the former potentiometers can have total resistances of 5000 ohms each, while potentiometer $X$, can have a total resistance of 25 ohms.

Phase inversion networks $P_2 \ldots P_n$ are provided with corresponding A potentiometers, S switches and R resistors, as illustrated.

The contactors of potentiometers $X_1$, $X_2 \ldots X_n$ are mechanically coupled to drive the shafts of respective servo motors $M_1$, $M_2 \ldots M_n$, which are rotated by the output signals from respective servo amplifiers $V_1$, $V_2 \ldots V_n$. One input terminal of amplifier $V_1$ is connected to ground and the second input terminal thereof is connected to the second terminals of resistors $R_{11}$, $R_{12} \ldots R_{1n}$. One input terminal of the amplifier $V_2$ is connected to ground and the second input terminal thereof is connected to the second terminals of resistors $R_{21}$, $R_{22} \ldots R_{2n}$. One input terminal of amplifier $V_n$ is connected to ground and the second input terminal thereof is connected to the second terminals of resistors $R_{n1}$, $R_{n2} \ldots R_{nn}$. The second input terminals of amplifiers $V_1$, $V_2 \ldots V_n$ are also connected to the contactors of respective potentiometers $K_1$, $K_2 \ldots K_n$ through respective resistors $T_1$, $T_2 \ldots T_n$.

When the computer is employed to solve the set of equations described above for the values of $x_1, x_2 \ldots x_n$, the values of the constants $k_1, k_2 \ldots k_n$ are set on respective potentiometers $K_1$, $K_2 \ldots K_n$. In this manner the voltages appearing at the contactors of these potentiometers, with respect to ground, are representative of the corresponding constants $k$ in the set of equations. The coefficients $a_{11}, a_{21} \ldots a_{n1}$ are likewise set on respective potentiometers $A_{11}$, $A_{21} \ldots A_{n1}$. If these values of the $a$ coefficients are positive, the switches S associated with the A potentiometers are moved to the right-hand position to engage respective leads $G_1$. If the value of a particular coefficient is negative, the corresponding S switch is moved to the left-hand position to engage lead $H_1$. In like manner, the coefficients $a_{12}, a_{22} \ldots a_{n1}$ are set on respective potentiometers $A_{12}, A_{22} \ldots A_{n2}$ and the coefficient $a_{1n}, a_{2n} \ldots a_{nn}$ are set on respective potentiometers $A_{1n}, A_{2n} \ldots A_{nn}$.

Once the coefficients and constants are set on their respective potentiometers, switch 13 is closed to energize the computer. The potential appearing at the contactor of potentiometers $A_{12}$ is representative of the product $a_{11}x_1$. Similarly, the potential appearing at the contactor of potentiometer $A_{12}$ is representative of the produce $a_{12}x_2$ and the potential appearing at the contactor of potentiometer $A_{1n}$ is representative of the product $a_{1n}x_n$. These potentials are summed by the network comprising resistors $R_{11}, R_{12} \ldots R_{1n}$. The summed potential is applied to the second input terminal of amplifier $V_1$ in opposition to the potential appearing at the contactor of potentiometer $K_1$. If these two potentials applied to the second terminal of amplifier $V_1$ are unequal, motor $M_1$ is rotated to move the contactor of potentiometer $X_1$, thereby varying the summed potential. Rotation of motor $M_1$ continues until the two opposing potentials applied to the input of amplifier $V_1$ are equal. Motors $M_2 \ldots M_n$ rotate simultaneously in response to the corresponding potential differences applied to the inputs of respective amplifiers $V_2 \ldots V_n$. Rotation of motors $M_2 \ldots M_n$ adjusts the settings of the contactors of potentiometer $X_2 \ldots X_n$ until these latter motors also come to rest. When the network is completely balanced, all of the motors $M_1, M_2 \ldots M_n$ are stationary and the positions of the contactors of potentiometers $X_1, X_2 \ldots X_n$ are representative of the respective values of the unknown terms $x_1, x_2 \ldots x_n$ of the set of equations being solved.

The phase inversion networks $P_1, P_2 \ldots P_n$ are provided so that the voltages at the contactors of the A potentiometers are 180° out of phase with the voltages at the contactors of the K potentiometers when the coefficients of the equations are positive. This results in the voltages applied to the V amplifiers from the A and K potentiometers being in phase opposition to one another. When the magnitudes of these voltages are equal the associated servo motors remain stationary. When the individual coefficients are negative the associated S switches are moved to the respective left-hand positions to engage the associated H leads. This compensates for the sign change, and the potentials applied to the inputs of the V amplifiers remain in opposition.

Figure 2:
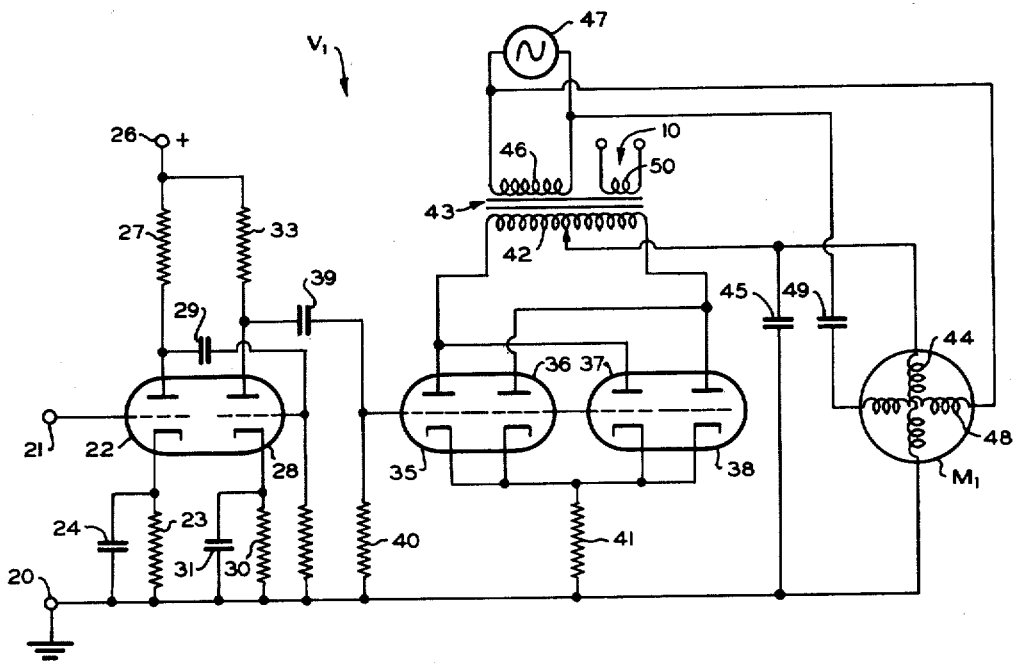
Figure 2 is a schematic circuit diagram of one of the amplifiers and servo motors shown in Figure 1.

In Figure 2 there is shown a suitable amplifier and servo motor for use in the computer of Figure 1. The first input terminal 20 of amplifier $V_1$ is connected to ground and the second input terminal 21 is connected to the control grid of a first triode 22. The cathode of triode 22 is connected to ground through a resistor 23 which is shunted by a capacitor 24. The anode of triode 22 is connected to a positive potential terminal 26 through a resistor 27 and to the control grid of a second triode 28 through a capacitor 29. The cathode of triode 28 is connected to ground through a resistor 30 which is shunted by a capacitor 31. The anode of triode 28 is connected to positive potential terminal 26 through a resistor 33 and to the control grids of four triodes 35, 36, 37 and 38 through a capacitor 39. The control grids of these four triodes 35, 36, 37 and 38 are connected to ground through a resistor 40.

The cathodes of triodes 35, 36, 37 and 38 are connected to ground through a common resistor 41. The anodes of triodes 35 and 37 are connected to the first end terminal of the secondary winding 42 of a transformer 43. The anodes of triodes 36 and 38 are connected to the second end terminal of transformer winding 42. The center tap of transformer winding 42 is connected to one end terminal of the first winding 44 of a two phase reversible motor $M_1$. The second terminal of motor winding 44 is connected to ground. A capacitor 45 is connected in shunt with motor winding 44. The primary winding 46 of transformer 43 is energized by a voltage source 47 which is also connected in series relation with a capacitor 49 and the second winding 48 of motor $M_1$. A second secondary winding 50 on transformer 43 comprises voltage source 10 of Figure 1.

A signal applied to the input terminals of amplifier $V_1$ is amplified by triodes 22 and 28 and applied to the control grids of triodes 35, 36, 37 and 38. In the absence of a signal being applied to the control grids of triodes 35 and 36, substantially equal currents flow through the two tubes on alternate half cycles of the potential from voltage source 47 being applied to the plates of the two triodes. The resulting current flow through motor winding 44 is of a frequency twice the frequency of voltage source 47. Since the voltage applied across motor winding 48 is of the same frequency as voltage source 47, the motor remains stationary. However, if a voltage signal is applied to the control grids of triodes 35 and 37, the conduction through the two triodes increases from the previous value during alternate half cycles of the potential applied to the anodes of the two triodes. This results in an unbalanced output signal flowing through motor winding 44 which has a component of the same frequency as the frequency of voltage source 47 so that motor $M_1$ rotates in either a forward or reverse direction depending upon the relative phase of the input signal applied to amplifier $V_1$. The phase of the signal applied to amplifier $V_1$, in turn depends upon the relative magnitude of the two voltages applied to input terminal 21 as previously described. Triodes 37 and 38 are provided in parallel with respective triodes 35 and 36 as a safety factor in the event one of the triodes should burn out.

Figure 3:
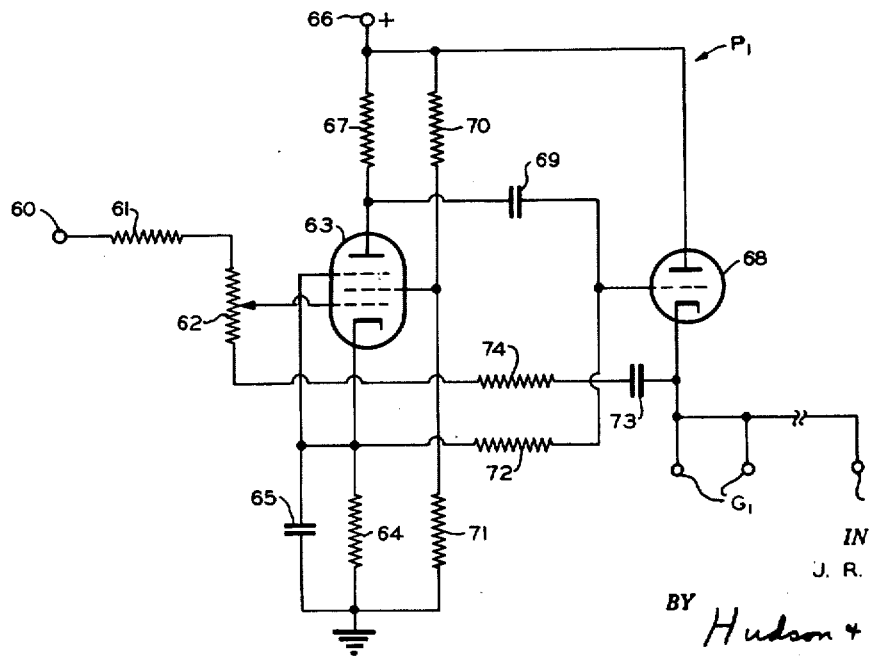
Figure 3 is a schematic circuit diagram of a phase inversion network which can be employed in the circuit of Figure 1.

The phase inversion networks $P_1, P_2 \ldots P_n$ are employed to provide voltages 180° out of phase with the input voltages applied thereto. These networks preferably comprise a voltage amplifying tube feeding a cathode follower to provide a low impedance output signal. The voltage gain of the amplifier should be substantially unity so that the voltages applied to the G and H leads are of substantially the same magnitude. In Figure 3 there is shown a phase inversion network which is particularly adapted for use in the computer of Figure 1.

The first input terminal 60 of phase inversion network $P_1$ is connected to the contactor of potentiometer $X_1$ in Figure 1. The second input terminal of the first inversion network is considered to be ground. Terminal 60 is connected through a resistor 61 to the first end terminal of a potentiometer 62. The contactor of potentiometer 62 is connected to the control grid of a pentode 63. The cathode and the suppressor grid of pentode 63 are connected to ground through a resistor 64 which is shunted by a capacitor 65. The anode of pentode 63 is connected to a positive potential terminal 66 through a resistor 67 and to the control grid of a triode 68 through a capacitor 69. Resistors 70 and 71 are connected in series relation between voltage terminal 66 and ground, the junction between these two resistors being connected to the screen grid of pentode 63. The control grid of triode 68 is connected to ground through series connected resistors 72 and 64, and the cathode of triode 68 is connected directly to leads $G_1$. Leads $G_1$ are considered to represent the first output terminal of the phase inversion network, the second output terminal being ground. The cathode of triode 68 is also connected to the second end terminal of potentiometer 62 through a capacitor 73 and a resistor 74 connected in series relation, these elements forming a degenerative feedback network. The circuit of Figure 3 thus provides output voltages at least $G_1$ which are 180° out of phase with the input voltage applied to terminal 60 and of substantially the same amplitude.

From the foregoing description it should be apparent that the computer of this invention offers several important advantages in the solution of simultaneous linear equations. The most important feature is the saving of time which results from the fact that the balancing operation is performed simultaneously and automatically in each individual network. While the invention has been described in conjunction with a present preferred embodiment, it should be evident that the invention is not limited thereto.

What is claimed is:

1. A computer for solving a set of equations of the form $$\sum_{j=1}^{n} a_{ij}x_j = k_i$$

for the values of $x$ where $i$ varies from one to $n$, and $n$ is a positive integer greater than one, comprising: $n$ networks, each of said networks including a first potentiometer, $n$ second potentiometers having first end terminals thereof connected to the contactor of said first potentiometer, the second end terminals of said second potentiometers being connected to one end terminal of said first potentiometer, a third potentiometer, a servo motor, means connecting the drive shaft of said servo motor to the contactor of said first potentiometer, and means applying the potential between the contactor of said third potentiometer and one end terminal thereof to the input of said servo motor; a voltage source; means applying said voltage source across the end terminals of said first and third potentiometers in each of said networks; and means summing the potentials between said one end terminals of said first potentiometers and the contactors of corresponding ones of said second potentiometers in each of said networks and applying said summed potentials to the inputs of respective ones of said servo motors.

2. A computer for solving a set of equations of the form $$\sum_{j=1}^{n} a_{ij}x_j = k_i$$

for the values of $x$ where $i$ varies from one to $n$, and $n$ is a positive integer greater than one, comprising: $n$ networks, each of said networks including a first potentiometer, phase inversion means to provide an output alternating signal 180° out of phase with an input signal supplied thereto, the input terminals of said phase inversion means being applied to the contactor and one end terminal of said first potentiometer, respectively, $n$ second potentiometers having first end terminals thereof connected to the first output terminal of said phase inversion means, the second end terminals of said second potentiometers being connected to said one end terminal of said first potentiometer and the second output terminal of said phase inversion means, a third potentiometer, a servo motor, means connecting the drive shaft of said servo motor to the contactor of said first potentiometer, and means applying the potential between the contactor of said third potentiometer and one end terminal thereof to the input of said servo motor; an alternating voltage source; means applying said voltage source across the end terminals of said first and third potentiometers in each of said networks; and means summing the potentials between said one end terminals of said first potentiometers and the contactors of corresponding ones of said second potentiometers in each of said networks and applying said summed potentials to the inputs of respective ones of said servo motors.

3. The combination in accordance with claim 2 wherein said phase inversion means each comprises a first vacuum tube having at least an anode, a cathode and a control grid, means connecting said input terminals to the control grid and cathode of said first tube, a second tube having an anode, a cathode and a control grid, means connecting the anode of said first tube to the control grid of said second tube, and a feedback circuit connected between the cathode of said second tube and the control grid of said first tube, the cathode of said second tube representing one output terminal of said phase inversion means.

4. The combination in accordance with claim 2 further comprising switching means in each of said network to connect the end terminals of said second potentiometers selectively to the output terminals of said phase inversion means and to the contactor and said one end terminal of said first potentiometer.

5. A computer for solving a set of equations of the form $$\sum_{j=1}^{n} a_{ij}x_j = k_i$$

for the values of $x$ where $i$ varies from one to $n$, and $n$ is a positive integer greater than one, comprising: $n$ networks, each of said networks including a first potentiometer, phase inversion means to provide an output alternating signal 180° out of phase with an input signal supplied thereto, the input terminals of said phase inversion means being applied to the contactor and one end terminal of said first potentiometer, respectively, $n$ second potentiometers having first end terminals thereof connected to the first output terminal of said phase inversion means, the second end terminals of said second potentiometers being connected to said one end terminal of said first potentiometer and the second output terminal of said phase inversion means, $n$ first resistors having first end terminals thereof connected to the respective contactors of said second potentiometers, an amplifier, a reversible motor actuated by the output signal from said amplifier, means connecting the drive shaft of said motor to the contactor of said first potentiometer, a third potentiometer, and a second resistor having one end terminal thereof connected to the contactor of said third potentiometer, the second end terminal of said second resistor being connected to one input terminal of said amplifier, the second input terminal of said amplifier being connected to said one end terminal of said first potentiometer; an alternating voltage source; means applying said voltage source across the end terminals of said first and third potentiometers in each of said networks; and $n$ leads connected to the respective said one input terminals of said amplifiers, each of said leads being connected to the second end terminals of respective ones of said first resistors in each of said networks.

6. The combination in accordance with claim 5 further comprising switching means in each of said networks to connect the end terminals of said second potentiometers selectively to the output terminals of said phase inversion means and to the contactor and said one end terminal of said first potentiometer.

7. A computer for solving a set of simultaneous equations of the form $$\sum_{j=1}^{n} a_{ij}x_j = k_i$$

for the values of $x$ where $i$ varies from one to $n$, and $n$ is a positive integer greater than one, comprising: $n$ networks, each of said networks including a first potentiometer, phase inversion means to provide an output alternating signal 180° out of phase with an input signal supplied thereto, the input terminals of said phase inversion means being applied to the contactor and one end terminal of said first potentiometer, respectively, $n$ second potentiometers, $n$ switches to connect the first end terminals of said second potentiometers selectively to the contactor of said first potentiometer and to the first output terminal of said phase inversion means, the second end terminals of said second potentiometers being connected to said one end terminal of said first potentiometer and the second output terminal of said phase inversion means, $n$ first resistors having first end terminals thereof connected to the respective contactors of said second potentiometers, the contactor settings of said $n$ second potentiometers representing respective $a$ coefficient for $i$ equal one to $n$, an amplifier, a reversible motor actuated by the output signal from said amplifier, means connecting the drive shaft of said motor to the contactor of said first potentiometer, a third potentiometer, and a second resistor having one end terminal thereof connected to the contactor of said third potentiometer, the contactor setting of said third potentiometer representing one of said $k$ coefficient, the second end terminal of said second resistor being connected to one input terminal of said amplifier, the second input terminal of said amplifier being connected to said one end terminal of said first potentiometer; an alternating voltage source; means applying said voltage source across the end terminals of said first and third potentiometers in each of said networks; and $n$ leads connected to the respective said one input terminals of said amplifiers, each of said leads being connected to the second end terminals of respective ones of said first resistors in each of said networks, the contactor settings of said first potentiometers representing respective $x$ values when all of said motors are stationary.

References Cited in the file of this patent

UNITED STATES PATENTS

| | | |
|---|---|---|
| 2,476,747 | Lovell | July 19, 1949 |
| 2,505,061 | Oliver | Apr. 25, 1950 |
| 2,584,809 | Oberlin | Feb. 5, 1952 |

OTHER REFERENCES

Fritz: "Analog Computers for Coordinate Transformation," Review of Scientific Instruments, vol. 23, No. 12, December 1952, pp. 667–671.

UNITED STATES PATENT OFFICE
Certificate of Correction

Patent No. 2,808,989

October 8, 1957

James R. Younkin

It is hereby certified that error appears in the printed specification of the above numbered patent requiring correction and that the said Letters Patent should read as corrected below.

Column 1, lines 70 to 74, the equation should appear as shown below instead of as in the patent—

$$a_{11}x_1 + a_{12}x_2 + \ldots + a_{1n}x_n = k_1$$
$$a_{21}x_1 + a_{22}x_2 + \ldots + a_{2n}x_n = k_2$$
$$\cdot$$
$$\cdot$$
$$\cdot$$
$$a_{n1}x_1 + a_{n2}x_2 + \ldots + a_{nn}x_n = k_n$$

column 2, line 19, for "network" read —networks—; lines 22 and 23, for "potentiometers" read —potentiometer—; column 3, line 10, for "$A_{12}$" read —$A_{11}$—; line 12, for "produce" read —product—; column 6, line 5, for "network" read —networks—.

Signed and sealed this 17th day of December 1957.

[SEAL]

Attest:
KARL H. AXLINE,
*Attesting Officer.*

ROBERT C. WATSON,
*Commissioner of Patents.*